(12) United States Patent
Suzuki et al.

(10) Patent No.: US 11,092,502 B2
(45) Date of Patent: Aug. 17, 2021

(54) TORQUE SENSOR

(71) Applicants: DENSO CORPORATION, Kariya (JP); SOKEN, INC., Nisshin (JP)

(72) Inventors: Toshiro Suzuki, Kariya (JP); Shigetoshi Fukaya, Kariya (JP); Satoru Jinno, Kariya (JP); Ken Tanaka, Nisshin (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 182 days.

(21) Appl. No.: 16/430,479

(22) Filed: Jun. 4, 2019

(65) Prior Publication Data

US 2019/0285490 A1    Sep. 19, 2019

Related U.S. Application Data

(63) Continuation of application No. PCT/JP2018/010167, filed on Mar. 15, 2018.

(30) Foreign Application Priority Data

Mar. 31, 2017  (JP) .............................. JP2017-069923

(51) Int. Cl.
    *G01L 3/10*    (2006.01)
(52) U.S. Cl.
    CPC ................ *G01L 3/101* (2013.01); *G01L 3/10* (2013.01)
(58) Field of Classification Search
    CPC ... G01L 3/101; G01L 3/10; G01L 3/04; G01L 3/00; G01L 3/02

(Continued)

(56) References Cited

U.S. PATENT DOCUMENTS 7,644,635 B2    1/2010  Prudham et al.
8,844,380 B2 *  9/2014  Takahashi ............... G01L 3/104
                                                        73/862.193

(Continued)

FOREIGN PATENT DOCUMENTS

JP          3874642 B2    1/2007
JP       2007-187481 A    7/2007

(Continued)

*Primary Examiner* — Octavia Hollington
(74) *Attorney, Agent, or Firm* — Posz Law Group, PLC

(57) ABSTRACT

A torque sensor is provided with a torsion bar which converts torque applied between a first shaft and a second shaft into a torsional displacement. A multipole magnet is fixed to one end side of either the first shaft or the torsion bar and in which N poles and S poles are magnetized alternately in a circumferential direction. A plurality of first yokes is provided in the circumferential direction on a radially outer side of the multipole magnet. A plurality of second yokes is provided in the circumferential direction on the radially outer side of the multipole magnet in such a way that each second yoke is sandwiched between two first yokes. A set of magnetic flux collecting members includes a first main body portion and a second main body portion, and forms a magnetic circuit in conjunction with the plurality of first yokes and the plurality of second yokes in a magnetic field generated by the multipole magnet. A magnetic sensor is provided radially outside the first main body portion and the second main body portion to detect a magnetic flux density generated in the magnetic circuit.

8 Claims, 12 Drawing Sheets

(58) Field of Classification Search
USPC ...... 73/862.325, 862.331, 862.333, 862.335, 73/862.326
See application file for complete search history.

(56) References Cited

U.S. PATENT DOCUMENTS

| | | |
|---|---|---|
| 9,434,410 B2 | 9/2016 | Lee |
| 2008/0250873 A1 | 10/2008 | Prudham et al. |
| 2012/0285266 A1* | 11/2012 | Takahashi ............... G01L 5/221 |
| | | 73/862.331 |
| 2012/0297916 A1 | 11/2012 | Lee |
| 2013/0152702 A1 | 6/2013 | Takahashi et al. |
| 2013/0312539 A1* | 11/2013 | Shimomura ............ G01L 3/104 |
| | | 73/862.325 |
| 2016/0332665 A1 | 11/2016 | Lee |

FOREIGN PATENT DOCUMENTS

| | | |
|---|---|---|
| JP | 6007828 B2 | 8/2012 |
| JP | 2012-237728 A | 12/2012 |
| JP | 2013-195108 A | 9/2013 |
| JP | 2016-161344 A | 9/2016 |
| WO | 2008/105541 A1 | 9/2008 |

* cited by examiner

TORQUE SENSOR

CROSS REFERENCE TO RELATED APPLICATION

The present application is a continuation application of International Patent Application No. PCT/JP2018/010167 filed on Mar. 15, 2018, which designated the United States. and claims the benefit of priority from Japanese Patent Application No. 2017-069923 filed on Mar. 31, 2017. The entire disclosures of both of the above applications are incorporated herein by reference.

TECHNICAL FIELD

The present disclosure relates to a torque sensor.

BACKGROUND

A torque sensor conventionally includes a magnetic yoke, a magnetic flux collecting member and a magnetic sensor. The magnetic yoke forms a magnetic circuit in correspondence to a positional relationship with a multipole magnet provided on a rotation shaft. In the torque sensor, a shaft torque acting on the rotation shaft is calculated based on a change in magnetic flux density in the magnetic circuit. For example, the magnetic yoke has a plurality of claws located radially outside the entire periphery of the multipole magnet. An annular ring connects the plurality of claws at the radially outside of the claws. The magnetic flux collecting member is provided in the annular ring shape to surround the magnetic yoke.

SUMMARY

The present disclosure provides a torque sensor which includes a torsion bar, a multipole magnet, a plurality of first yokes, a plurality of second yokes, a magnetic flux collecting member and a magnetic sensor. The torsion bar converts a torque applied between two shafts into a torsional displacement. The multipole magnet is alternately magnetized in N pole and S pole in a circumferential direction. The plurality of first yokes and the plurality of second yokes are provided radially outside the multipole magnet. The magnetic flux collecting member includes a first main body portion and a second main body portion and forms a magnetic circuit in a magnetic field generated by the multipole magnet together with the plurality of first yokes and the plurality of second yokes. The magnetic sensor is provided to detect a magnetic flux density generated in the magnetic circuit.

BRIEF DESCRIPTION OF THE DRAWINGS

The above and other objects, features and advantages of the present disclosure will become more apparent from the following detailed description made with reference to the accompanying drawings. In the drawings.

Embodiment

Figure 1:
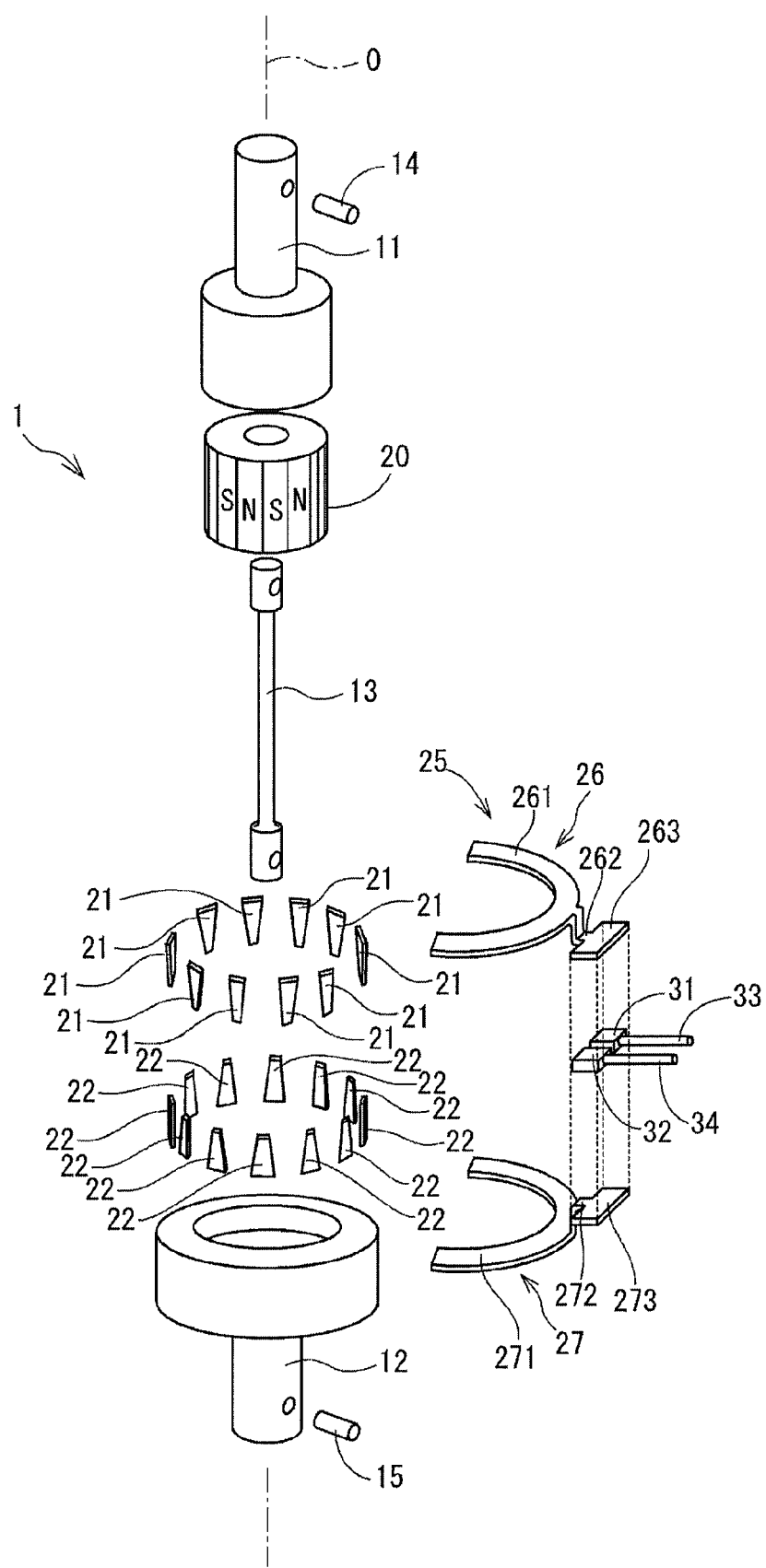
FIG. 1 is an exploded perspective view of a torque sensor according to a first embodiment.

Hereinafter, embodiments of a torque sensor of the present disclosure will be described based on the drawings. In the following plural embodiments, substantially identical elements are designated with the same reference numerals thereby to simplify the description.

First Embodiment

Figure 2:
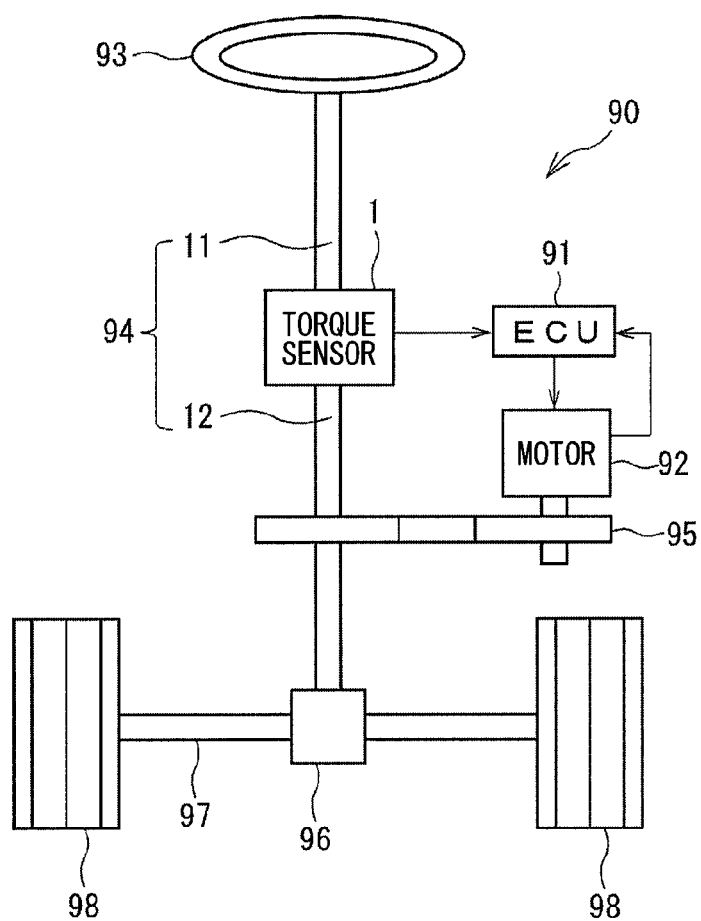
FIG. 2 is a schematic configuration diagram of an electric power steering apparatus to which the torque sensor according to the first embodiment is applied.

Referring first to FIG. 1 and FIG. 2, a torque sensor 1 according to a first embodiment is applied to, for example, an electric power steering apparatus 90 for assisting a steering operation of a vehicle, as shown in FIG. 2, which shows an entire configuration of a steering system including the electric power steering apparatus 90.

As shown in FIG. 2, the torque sensor 1 is provided on a steering shaft 94 connected to a steering wheel 93. A pinion gear 96 is provided at an axial end of the steering shaft 94. The pinion gear 96 meshes with a rack shaft 97. A pair of road wheels 98 is rotatably coupled to ends of the rack shaft 97 via a tie rod or the like. The rotational movement of the steering shaft 94 is converted into linear movement of the rack shaft 97 by the pinion gear 96, and the pair of road wheels 98 is steered.

The torque sensor 1 is provided between an input shaft 11 as a first shaft and an output shaft 12 as a second shaft which jointly constitute the steering shaft 94. The torque sensor 1 detects a steering torque applied to the steering shaft 94 and outputs it to an electronic control unit (ECU) 91. The ECU 91 controls the output of a motor 92 in accordance with the detected steering torque. The steering assist torque generated by the motor 92 is transmitted to the steering shaft 94 after speed reduction by a reduction gear 95.

Next, configuration of the torque sensor 1 will be described with reference to FIG. 1, FIG. 3 and FIG. 4.

As shown in FIG. 1, the torque sensor 1 includes a torsion bar 13, a multipole magnet 20, a plurality of first yokes 21, a plurality of second yokes 22, a set of magnetic flux collecting members 25, and two magnetic sensors 31 and 32.

The torsion bar 13 is a rod-like resilient member and is provided between the input shaft 11 and the output shaft 12. One end side of the torsion bar 13 is fixed to the input shaft 11 by a fixing pin 14. The other end side of the torsion bar 13 is fixed to the output shaft 12 by a fixing pin 15. Thereby, the torsion bar 13 connects the input shaft 11 and the output shaft 12 on the rotation axis O. The torsion bar 13 converts the steering torque applied to the steering shaft 94 into a torsional displacement.

The multipole magnet 20 is a cylindrical member and is fixed to the input shaft 11. In the multipole magnet 20, N poles and S poles which generate magnetic flux in the radial direction, are alternately provided in the circumferential direction about the rotation axis O. In the first embodiment, the multipole magnet 20 has, for example, 12 pairs of N poles and S poles, that is, 24 poles in total.

The first yoke 21 is a piece of a generally trapezoidal plate made of a soft magnetic material. The plurality of first yokes 21 is provided at equal intervals over the entire circumference of the multipole magnet 20 radially outside of the end of the multipole magnet 20 on the input shaft 11 side. The first yoke 21 is provided such that a portion where the width in the circumferential direction of the multipole magnet 20 is narrower is located on the output shaft 12 side. In the first embodiment, twelve first yokes 21 are provided. The first yoke 21 forms a magnetic circuit in the magnetic field formed by the multipole magnet 20.

The second yoke 22 is also a piece of a generally trapezoidal plate made of a soft magnetic material. The plurality of second yokes 22 is provided at equal intervals over the entire circumference of the multipole magnet 20 radially outside the end of the multipole magnet 20 on the output shaft 12 side. The second yoke 22 is provided such that a portion where the width in the circumferential direction of the multipole magnet 20 is narrower is located on the input shaft 11 side. In the first embodiment, twelve second yokes 22 are provided. The second yoke 22 forms a magnetic circuit in the magnetic field formed by the multipole magnet 20.

The first yoke 21 and the second yoke 22 are alternately arranged in the circumferential direction about the rotation axis O. That is, the first yoke 21 or the second yoke 22 is provided so as to be sandwiched between the two second yokes 22 or the two first yokes 21, respectively. In this arrangement, as shown in FIG. 3, the first yoke 21 and the second yoke 22 face each other in the axial direction along the rotation axis O (hereinafter, referred to as "rotation axis direction") via an air gap. In the first embodiment, the first yokes 21 and the second yokes 22 are formed into an integrated member with resin (not shown) and fixed to the output shaft 12.

The set of magnetic flux collecting members 25 includes a first magnetic flux collecting member 26 and a second magnetic flux collecting member 27 both of which are formed of a soft magnetic material. The set of magnetic flux collecting members 25 is provided to face each other in the rotation axis direction which is the vertical direction in FIG. 1.

The first magnetic flux collecting member 26 includes a first main body portion 261, a first connecting portion 262, and a first supporting portion 263.

The first main body portion 261 is positioned on the input shaft 11 side of the plurality of first yokes 21 in the rotation axis direction. The first main body portion 261 is formed so that its cross-sectional shape perpendicular to the rotation axis of the torsion bar 13 is a partial annular ring having a central angle α1 of 180 degrees, as shown in FIG. 4. The first main body portion 261 is formed such that its radial width is larger than radial widths (thicknesses) of the plurality of first yokes 21 and the plurality of second yokes 22. The first main body portion 261 forms the magnetic circuit together with the first yoke 21.

Figure 3:
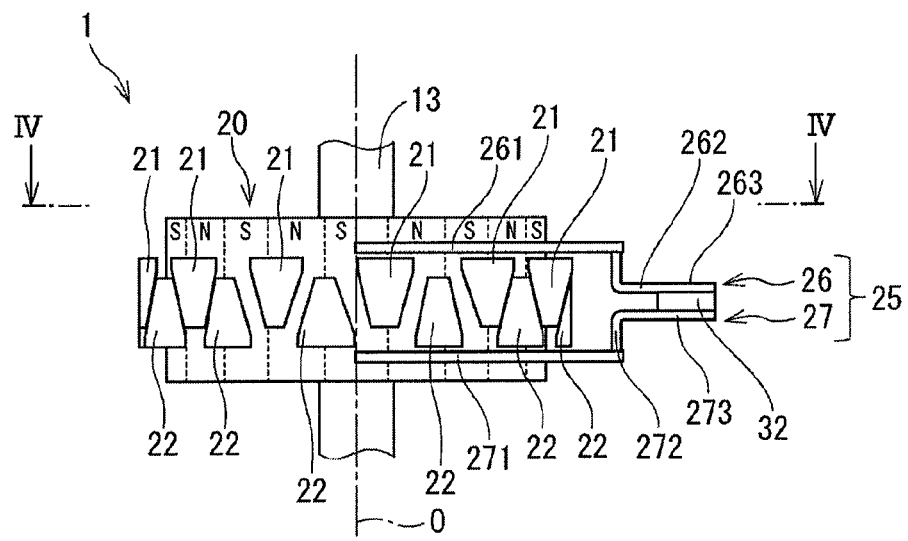
FIG. 3 is a schematic view of the torque sensor according to the first embodiment.

As shown in FIG. 3, the first connecting portion 262 is provided on the end surface of the first main body portion 261 on the first yoke 21 side. The first connecting portion 262 is formed to extend from the first main body portion 261 in the radially outward direction of the multipole magnet 20. The first connecting portion 262 separates the first supporting portion 263 from the multipole magnet 20, thereby reducing the influence of leakage flux from the multipole magnet 20 at the first supporting portion 263 and guiding the magnetic flux of the first main body portion 261 to the first supporting portion 263.

The first supporting portion 263 is provided at an end of the first connecting portion 262 radially oppositely to the side connected to the first main body portion 261. The first supporting portion 263 is formed in a flat plate shape and provided substantially perpendicularly to the rotation axis O to thereby support the magnetic sensors 31 and 32.

The second magnetic flux collecting member 27 includes a second main body portion 271, a second connecting portion 272, and a second supporting portion 273.

The second main body portion 271 is positioned on the output shaft 12 side of the plurality of second yokes 22 in the rotation axis direction. The second main body portion 271 is formed so that its cross-sectional shape perpendicular to the rotation axis O of the torsion bar 13 is a partially annular ring having the central angle of 180 degrees similarly to the first main body portion 261. The second main body portion 271 is formed such that its radial width is larger than radial widths (thicknesses) of the plurality of first yokes 21 and the plurality of second yokes 22. The second main body portion 271 forms the magnetic circuit together with the second yoke 22.

As shown in FIG. 3, the second connecting portion 272 is provided on the end surface of the second main body portion 271 on the second yoke 22 side. The second connecting portion 272 is formed to extend from the second main body portion 271 in the radially outward direction of the multipole magnet 20. The second connecting portion 272 separates the second supporting portion 273 from the multipole magnet 20, thereby reducing the influence of the leakage flux from the multipole magnet 20 at the second supporting portion 273 and guiding the magnetic flux of the second main body portion 271 to the second supporting portion 273.

The second supporting portion 273 is provided at an end of the second connecting portion 272 radially oppositely to the side connected to the second main body portion 271. The second supporting portion 273 is formed in a flat plate shape and provided substantially perpendicularly to the rotation axis O to thereby support the magnetic sensors 31 and 32.

The magnetic sensors 31 and 32 are provided between the first supporting portion 263 and the second supporting portion 273. Magnetic flux between the first supporting portion 263 and the second supporting portion 273 in the magnetic circuit, which is formed in the first yoke 21, the magnetic flux collecting member 25 and the second yoke 22, passes through the magnetic sensors 31 and 32. The magnetic sensors 31 and 32 detect the magnetic flux density between the first supporting portion 263 and the second supporting portion 273 as a strength of the magnetic field, and generate signals corresponding to the strength of the detected magnetic field as output signals. The output signals are output externally through wire harnesses 33 and 34.

Next, an operation of the torque sensor 1 will be described.

Figure 4:
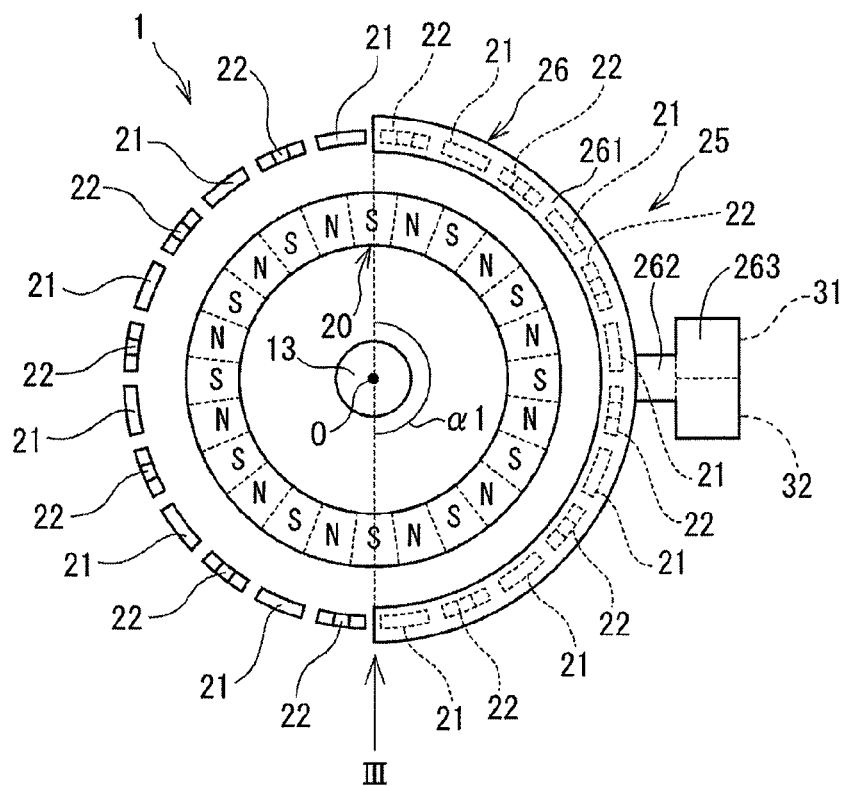
FIG. 4 is a cross-sectional view taken along line IV-IV in FIG. 3.

In a neutral state in which no steering torque is applied between the input shaft 11 and the output shaft 12 and no torsional displacement occurs in the torsion bar 13, a boundary between the N pole and the S pole of the multipole magnet 20 and a center of the first yoke 21 or the second yoke 22 coincide with each other as shown in FIG. 3 and FIG. 4. In the neutral state, same number of lines of magnetic force enter and exit from the N pole and the S pole of the multipole magnet 20 to each of the first yoke 21 and the second yoke 22. As a result, the magnetic flux does not leak into the gap between the first yoke 21 and the second yoke 22 and hence the magnetic flux densities detected by the magnetic sensors 31 and 32 are zero.

When a steering torque is applied between the input shaft 11 and the output shaft 12 and torsional displacement occurs in the torsion bar 13, the relative position between the multipole magnet 20 fixed to the input shaft 11 and the first and second yokes 21 and 22 fixed to the output shaft 12 changes in the circumferential direction.

For example, when the first yoke 21 faces the N pole and the second yoke 22 faces the S pole, the magnetic line having the S pole and the magnetic line having the N pole increase in the first yoke 21 and the second yoke 22, respectively. As a result, the density of magnetic flux passing through the magnetic sensors 31 and 32 changes substantially proportionally to the amount of torsional displacement of the torsion bar 13 and changes the polarity in accordance with the direction of torsion of the torsion bar 13. The magnetic sensors 31 and 32 detect the density of magnetic flux passing through the magnetic sensors 31 and 32, that is, the strength of the magnetic field, between the first supporting portion 263 and the second supporting portion 273. The torque sensor 1 thus detects the steering torque between the input shaft 11 and the output shaft 12 by outputting voltages corresponding to the detected magnetic field strength as the output signals.

In the torque sensor 1 according to the first embodiment, the first main body portion 261 of the first magnetic flux collecting member 26 is provided on the input shaft 11 side of the plurality of first yokes 21 in the rotation axis direction, and the second main body portion 271 of the second magnetic flux collecting member 27 is provided on the output shaft 12 side of the plurality of second yokes 22 in the rotation axis direction. Thereby, even when the input shaft 11 and the output shaft 12 are displaced in the radial direction, the facing area of the magnetic flux collecting member 25 with respect to the first yoke 21 and the second yoke 22 does not change. In addition, when the input shaft 11 and the output shaft 12 shift in the axial direction, the total amount of gaps between the first and second yokes 21 and 22 and the magnetic flux collecting member 25, that is, the total gap in the magnetic circuit does not change. Therefore, the torque sensor 1 can suppress the change of the detection sensitivity of the magnetic sensors 31 and 32 relative to the position change in the radial direction or the axial direction. Thereby, the robustness of the detection sensitivity relative to the position change of structural members forming the magnetic circuit can be secured.

In the torque sensor 1, the plurality of first yokes 21 and the plurality of second yokes 22 are provided in the radially outside of the multipole magnet 20. Thereby, the torque sensor 1 can be manufactured with less material required for forming the yoke in comparison to a case where an annular member is provided as a yoke to surround the entire radial outer periphery of the multipole magnet 20, In addition, when punching the annular member from a plate material, the central portion of the arcuate member is unnecessary and thus a relatively large remaining material is left. However, in the torque sensor 1, the plurality of first yokes 21 and the plurality of second yokes 22 can be formed separately, the remaining material can be used effectively to reduce the remaining material.

Figure 5:
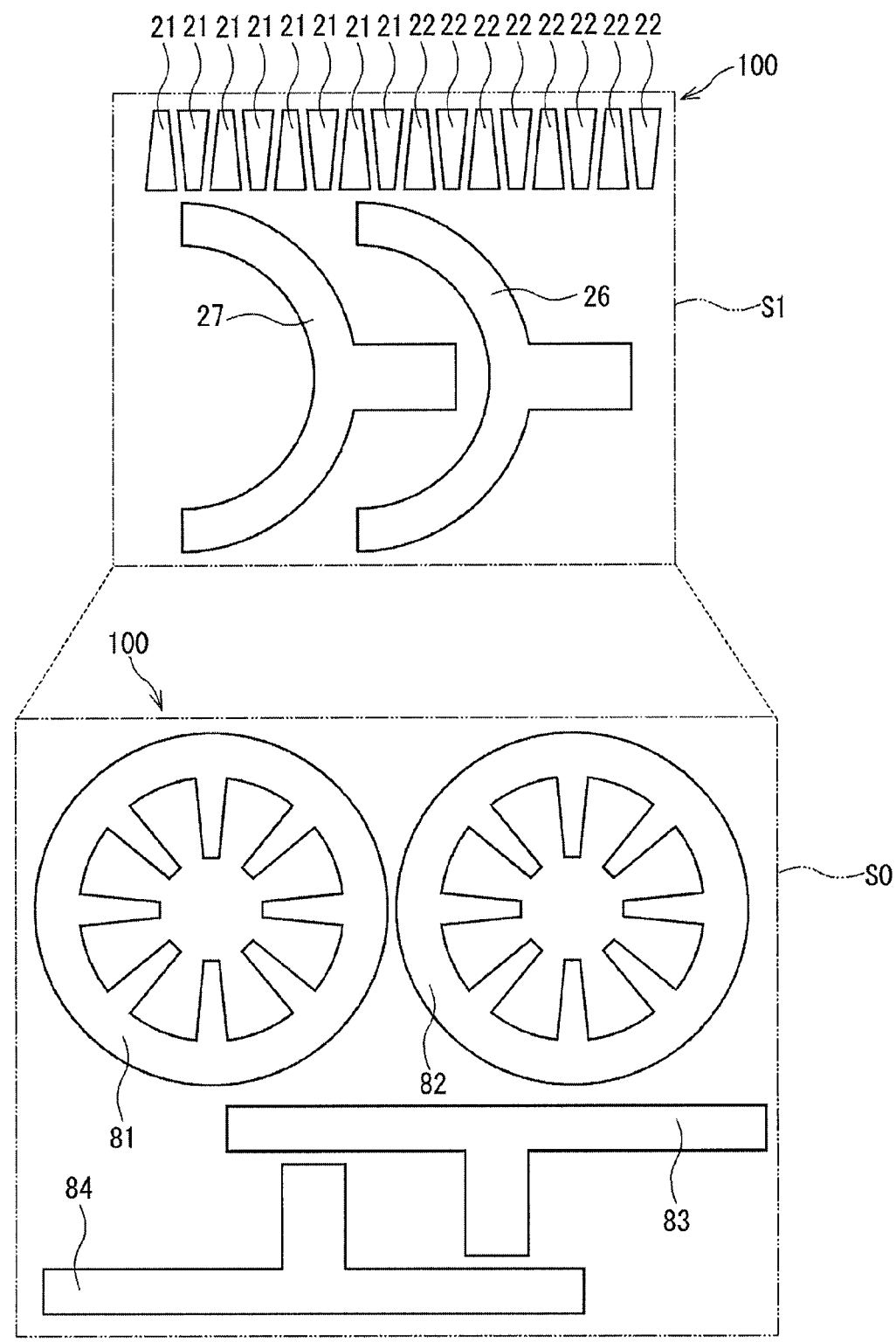
FIG. 5 is a schematic view illustrating an area of a plate material required in forming a yoke and a magnetic flux collecting member provided in the torque sensor according to the first embodiment in comparison to a comparative example.

FIG. 5 shows schematically a comparison of areas of the workpieces to be occupied in forming the yoke and the magnetic flux collecting member of the torque sensor.

FIG. 5 specifically shows positions of the eight first yokes 21, the eight second yokes 22, the first magnetic flux collecting member 26 and the second magnetic flux collecting member 27 of the torque sensor 1 on a plate member 100, which is a workpiece to be punched.

Further, FIG. 5 shows, as a comparative example, areas of a plate member 100 which are occupied in forming a torque sensor, which has annular yokes 81 and 82 each having eight claws and annular magnetic flux collecting members 83 and 84. It is noted in FIG. 5 that the torque sensor 1 and the torque sensor of the comparative example are illustrated as having sixteen yokes and sixteen claws for simplification, respectively.

In the torque sensor of the comparative example, it is necessary to punch the plate member 100 annularly according to the size of the yokes 81 and 82 as shown in the two-dot chain line S0 in forming the yokes 81 and 82. The area of the member 100 is thus relatively large. That is, manufacturing of the yokes 81 and 82 requires a relatively large material. Further, since the central portions of the yokes 81 and 82 are not used as the yokes 81 and 82, they are wasted. Since a relatively large amount of residual material is generated in manufacturing the torque sensor of the comparative example, the yield is low.

On the other hand, in the torque sensor 1, the eight first yokes 21 and eight second yokes 22, both of which are in generally the trapezoidal shape, are formed by punching out individually from the plate member 100. In this case, as shown in the two-dot chain line S1 of FIG. 5, the yokes 21 and 22 can be arranged closely to each other to be punched out. Thereby, as shown in FIG. 5, even in case that the first magnetic flux collecting member 26 and the second magnetic flux collecting member 27 are formed in an arcuate shape, the area S1 of the plate member 100 required to form the first yokes 21, the second yokes 22, the first magnetic flux collecting member 26 and the second magnetic flux collecting member 27 is smaller than the area S0 of the plate member 100 required to form the yokes 81 and 82 and the magnetic flux collecting members 83 and 84 of the torque sensor of the comparative example.

As described above, according to the first embodiment, the robustness of the detection sensitivity can be ensured, the area of the plate member necessary for manufacturing the structural members forming the magnetic circuit can be reduced, and the yield can be improved.

In addition, the set of magnetic flux collecting member 25 includes the first main body portion 261 and the second main body portion 271, which are formed in the arcuate shape having the central angle of 180 degrees. Here, the relationship between the size of the central angle of the magnetic flux collecting member and the detection sensitivity of the magnetic sensor will be described with reference to FIG. 6.

Figure 6:
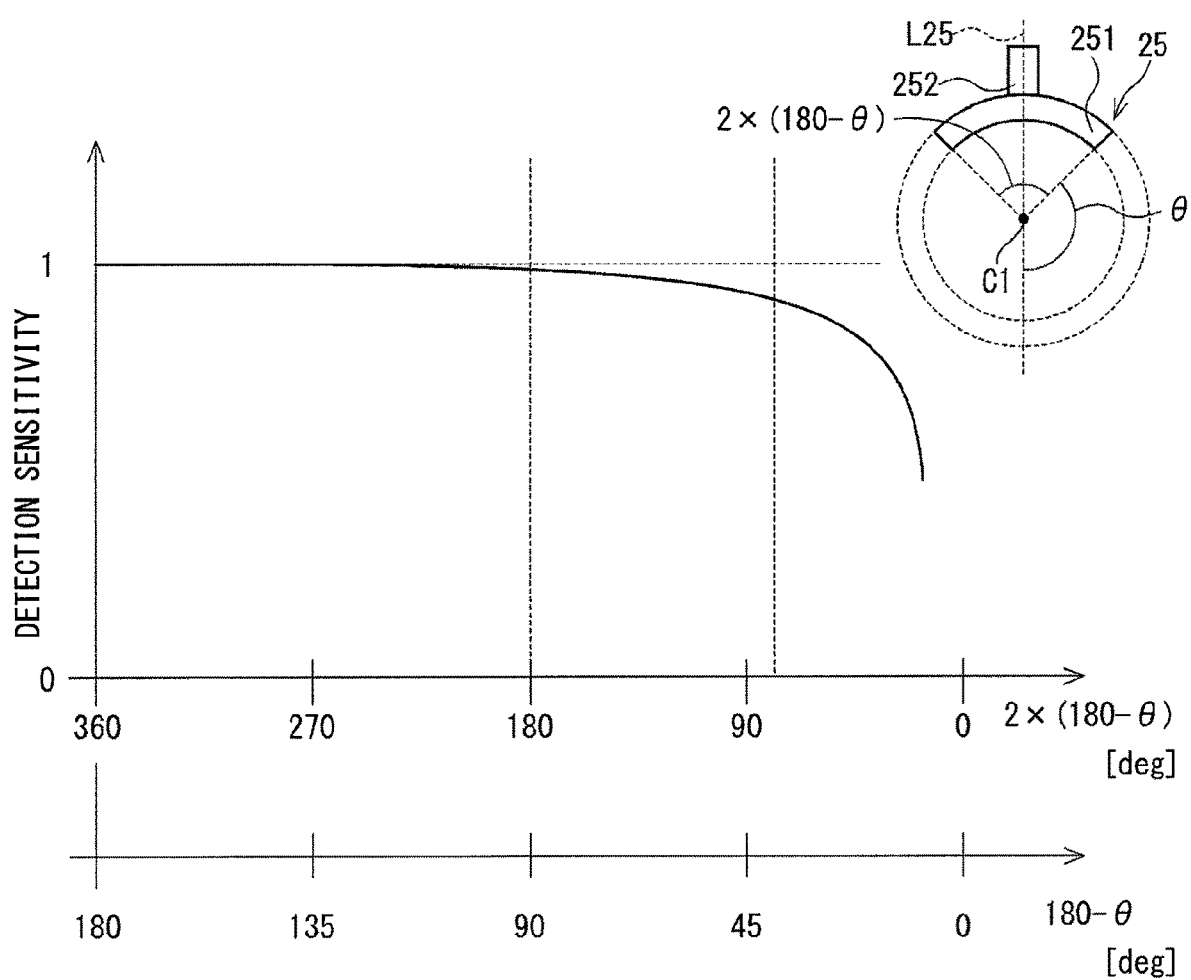
FIG. 6 is a characteristic diagram for explaining the effect of the torque sensor according to the first embodiment.

FIG. 6 shows a change in the detection sensitivity of the magnetic sensor with respect to the magnitude of the central angle of the magnetic flux collecting member.

In FIG. 6, the central angle of the magnetic flux collecting member is shown on the first horizontal axis. The size of the central angle of the magnetic flux collecting member is indicated as the central angle {2×(180−θ)}. Here, as shown in the schematic view of the magnetic flux collecting member 25 shown in FIG. 6, the angle θ is defined to be an angle in which the main body portion 251 is not provided in an angular range defined by dividing the main body portion 251 sandwiching a center line L25 passing through a center point C1 on the rotation axis O and the center of the connecting portion 252. That is, in the characteristic diagram of FIG. 6, in case that (180−θ) indicated by the second horizontal axis is 180, the central angle of the magnetic flux collecting member is 360 degrees, so the magnetic flux collecting member is formed in the full annular ring shape. Further, in case that (180−θ) indicated by the second horizontal axis is 90, the central angle of the magnetic flux collecting member is 180 degrees, so that the magnetic flux collecting member is formed in the arcuate shape, that is, in the semi-annular shape.

In FIG. 6, the detection sensitivity of the magnetic sensor at each central angle is indicated on the vertical axis as a relative value assuming that the detection sensitivity of the magnetic sensor is 1 when the central angle is 360 degrees.

As shown in FIG. 6, it is understood that the detection sensitivity of the magnetic sensor hardly decreases in case the central angle of the magnetic flux collecting member is between 360 degrees and 180 degrees. From this, it is understood that the main body portion at a position relatively distant from the connecting portion hardly contributes to guiding the magnetic flux to the magnetic sensor.

In the first embodiment, the first main body portion 261 and the second main body portion 271 of the magnetic flux collecting member 25 are formed to have the central angle of 180 degrees at which the detection sensitivity of the magnetic sensor hardly decreases. Thereby, while maintaining the detection sensitivity of the magnetic sensors 31 and 32, it is possible to reduce the area of the workpieces required to form the set of magnetic flux collecting members 25 as compared with the ring-shaped magnetic flux collecting member having the central angle of 360 degrees. Therefore, the yield can be further improved.

In the torque sensor 1, the first main body portion 261 and the second main body portion 271 are formed to have the radial widths larger than the radial widths of the first yoke 21 and the second yoke 22 so that the first main body portion 261 and the second main body portion 271 may face the first yoke 21 and the second yoke 22 in the axial direction even in case of displacement of the first main body portion 261 and the second main body portion 271 relative to the first yoke 21 and the second yoke 22 in the radial direction. Thereby, even in case that the first main body portion 261 and the second main body portion 271 are displaced relative to the first yoke 21 and the second yoke 22 in the radial direction, the facing area does not change, so that the detection sensitivity of the magnetic sensors 31 and 32 can be suppressed from changing.

Second Embodiment

A torque sensor according to a second embodiment will be described with reference to FIG. 7. In the second embodiment, the shape of a main body portion is different from that of the first embodiment.

A torque sensor 2 according to the second embodiment includes a torsion bar 13, a multipole magnet 20, a plurality of first yokes 21, a plurality of second yokes 22, a set of magnetic flux collecting members 35, and two magnetic sensors 31 and 32.

The set of magnetic flux collecting members 35 includes a first magnetic flux collecting member 36 and a second magnetic flux collecting member (not shown) which are all formed of a soft magnetic material. The first magnetic flux collecting member 36 and the second magnetic flux collecting member of the set of magnetic flux collecting member 35 are provided to face each other in the rotation axis direction.

Figure 7:
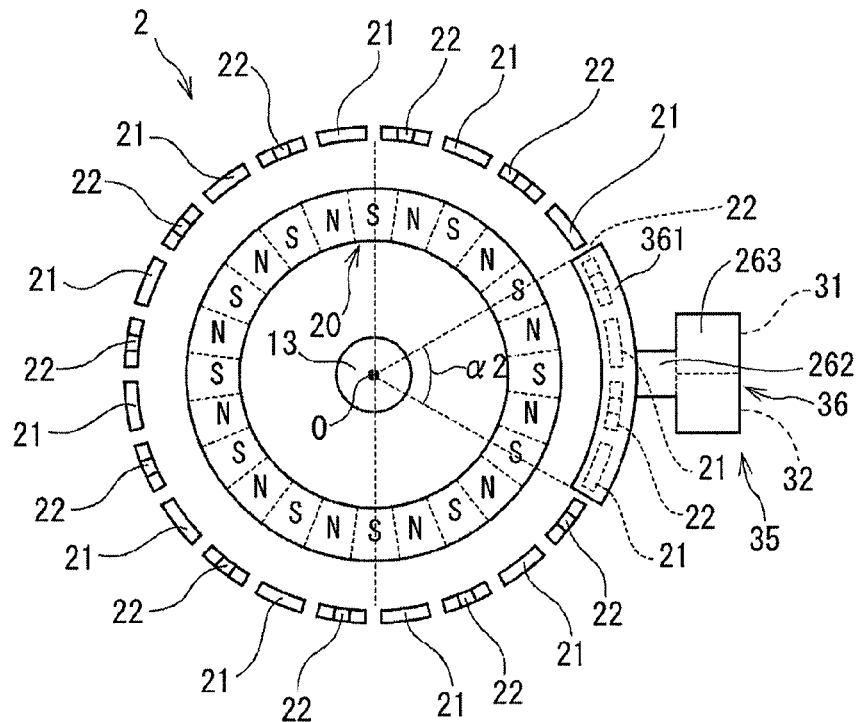
FIG. 7 is a schematic view of a torque sensor according to a second embodiment.

FIG. 7 shows schematically an arrangement of the multipole magnet 20, the first yoke 21 and the first magnetic flux collecting member 36 as viewed in the rotation axis direction. The first magnetic flux collecting member 36 includes a first main body portion 361, a first connecting portion 362, and a first supporting portion 363. Here, the configuration of the first magnetic flux collecting member 36 will be described. The second magnetic flux collecting member included in the set of magnetic flux collecting members 35 has the same shape as that of the first magnetic flux collecting member 36.

The first main body portion 361 is positioned on the input shaft 11 side of the plurality of first yokes 21 in the rotation axis direction. The first main body portion 361 is formed so that the cross-sectional shape perpendicular to the rotation axis O is a partial annular ring shape (arcuate shape) having a central angle α2 smaller than 180 degrees, as shown in FIG. 7. The first main body portion 361 forms the magnetic circuit together with the first yoke 21.

The first connecting portion 262 is provided on an end face of the first main body portion 361 on the first yoke 21 side, and is formed to extend from the first main body portion 361 in the radially outward direction of the multipole magnet 20. In the torque sensor 2 according to the second embodiment, each main body portion of the set of magnetic flux collecting members 35 is formed in the semi-annular shape having the central angle smaller than 180 degrees. In this way, the second embodiment provides the same advantage as that of the first embodiment.

Further, the size of the magnetic flux collecting member 35 is smaller than that of the magnetic flux collecting member 25 of the first embodiment. As a result, it is possible to further improve the yield while further reducing the area of plate materials required for manufacturing the plurality of first yokes 21, the plurality of second yokes 22, and the set of magnetic flux collecting members 35.

Third Embodiment

A torque sensor according to a third embodiment will be described with reference to FIG. 8. In the third embodiment, the shape of a main body portion is different from that of the first embodiment.

A torque sensor 3 according to the third embodiment includes a torsion bar 13, a multipole magnet 20, a plurality of first yokes 21, a plurality of second yokes 22, a set of magnetic flux collecting members 40, and two magnetic sensors 31 and 32.

The set of magnetic flux collecting members 40 includes a first magnetic flux collecting member 41 and a second magnetic flux collecting member (not shown) which are all formed of a soft magnetic material. The first magnetic flux collecting member 41 and the second magnetic flux collecting member of the set of magnetic flux collecting member 41 are provided to face each other in the rotation axis direction.

Figure 8:
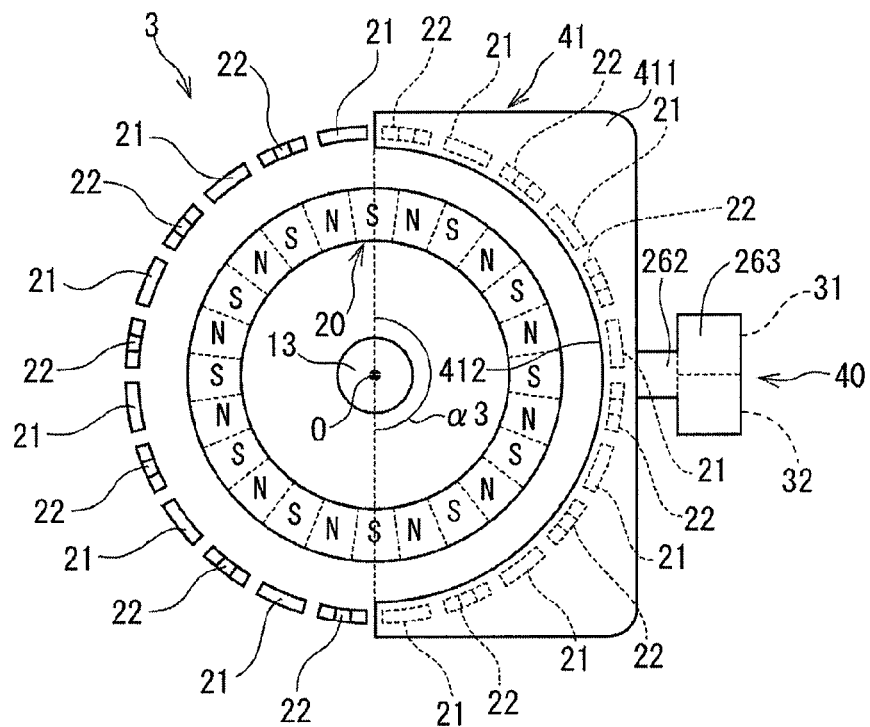
FIG. 8 is a schematic view of a torque sensor according to a third embodiment.

FIG. 8 shows schematically an arrangement of the multipole magnet 20, the first yoke 21 and the first magnetic flux collecting member 41 as viewed in the rotation axis direction. The first magnetic flux collecting member 41 includes a first main body portion 411, a first connecting portion 262, and a first supporting portion 263. Here, although the configuration of the first magnetic-flux collecting member 41 is described. The second magnetic flux collecting member of the set of magnetic flux collecting member 40 also has the same shape as that of the first magnetic flux collecting member 41.

The first main body portion 411 is positioned on the input shaft 11 side of the plurality of first yokes 21 in the rotation axis direction. The first main body portion 411 has a generally rectangular shape in cross section perpendicular to the rotation axis O. The rectangular shape is formed by cutting out a rectangular flat plate along the radially outside shape of the multipole magnet 20 to provide a cutout portion 412 at a side opposite to the first connecting portion 262 of the first main body portion 411. The cutout portion 412 is formed such that the central angle α3 is 180 degrees. The first main body portion 411 forms the magnetic circuit together with the first yoke 21.

The first connecting portion 262 is provided on an end face of the first main body portion 411 on the first yoke 21 side, and is formed to extend from the first main body portion 411 in the radially outward direction of the multipole magnet 20.

In the torque sensor 3 according to the third embodiment, each main body portion of the set of magnetic flux collecting members 40 has the rectangular shape in cross section perpendicular to the rotation axis O. The rectangular shape is formed by cutting out the flat plate along the radially outer shape of the multipole magnet 20 at the side opposite to the connecting portion of the main body portion. The third embodiment thus provides the same advantage as that of the first embodiment.

Fourth Embodiment

A torque sensor according to a fourth embodiment will be described with reference to FIG. 9. In the fourth embodiment, the shape of a main body portion is different from that of the first embodiment.

A torque sensor 4 according to the fourth embodiment includes a torsion bar 13, a multipole magnet 20, a plurality of first yokes 21, a plurality of second yokes 22, a set of magnetic flux collecting members 45, and two magnetic sensors 31 and 32.

The set of magnetic flux collecting members 45 includes a first magnetic flux collecting member 46 and a second magnetic flux collecting member (not shown) which are all formed of a soft magnetic material. The first magnetic flux collecting member 46 and the second magnetic flux collecting member of the set of magnetic flux collecting members 45 are provided to face each other in the rotation axis direction.

Figure 9:
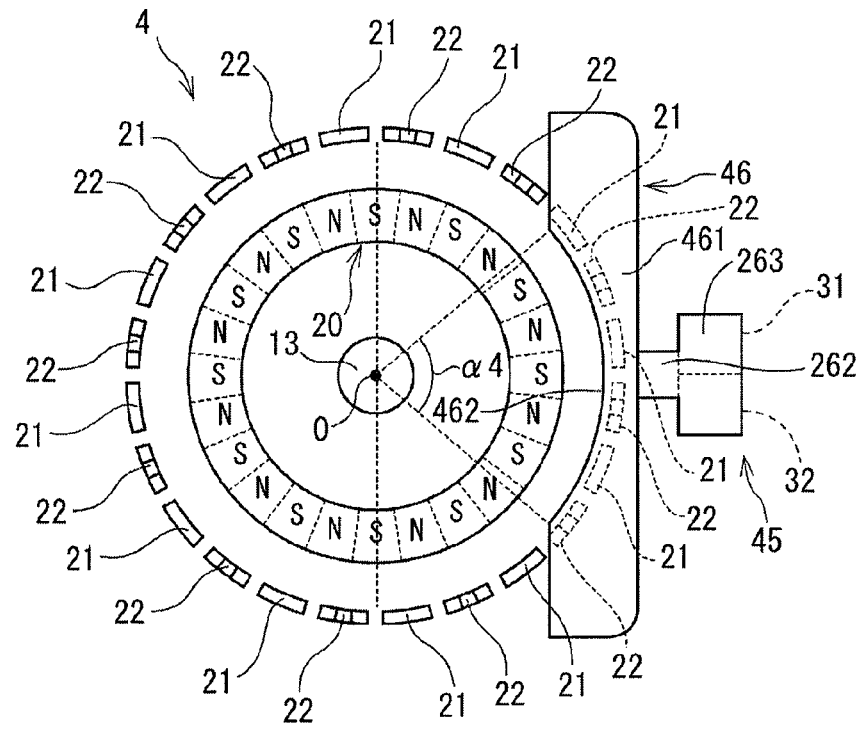
FIG. 9 is a schematic view of a torque sensor according to a fourth embodiment.

FIG. 9 shows schematically an arrangement of the multipole magnet 20, the first yoke 21 and the first magnetic flux collecting member 46 as viewed in the rotation axis direction. The first magnetic flux collecting member 46 includes a first main body portion 461, a first connecting portion 262, and a first supporting portion 263. Here, although the configuration of the first magnetic flux collecting member 41 is described, the second magnetic flux collecting member of the set of magnetic flux collecting members 45 also has the same shape as that of the first magnetic flux collecting member 46.

The first main body portion 461 is positioned on the input shaft 11 side of the plurality of first yokes 21 in the rotation axis direction. The first main body portion 461 has a cutout shape in cross section perpendicular to the rotation axis O similarly to the third embodiment shown in FIG. 8. The cutout shape is formed by cutting out a flat plate along the radially outside shape of the multipole magnet 20 at a side opposite to the first connecting portion 262 of the first main body portion 461. A cutout portion 462 is formed such that its central angle α4 is smaller than 180 degrees. The first main body portion 461 forms the magnetic circuit together with the first yoke 21.

The first connecting portion 262 is provided on an end face of the first main body portion 461 on the first yoke 21 side, and is formed to extend from the first main body portion 461 in the radially outward direction of the multipole magnet 20.

In the torque sensor 4 according to the fourth embodiment, each main body portion of the set of magnetic flux collecting members 45 has the cutout shape in cross section perpendicular to the rotation axis O. The cutout shape is formed by cutting out the flat plate along the radially outer shape of the multipole magnet 20 at the side opposite to the first connecting portion 262 of the first main body portion 461. The fourth embodiment thus provides the same advantage as that of the first embodiment.

Further, the size of the magnetic flux collecting member 45 is smaller than that of the magnetic flux collecting member 40 of the third embodiment. As a result, it is possible to further improve the yield than in the third embodiment while further reducing the area of plate material required for manufacturing the plurality of first yokes 21, the plurality of second yokes 22, and the set of magnetic flux collecting members 45.

Fifth Embodiment

A torque sensor according to a fifth embodiment will be described with reference to FIG. 10. In the fifth embodiment, the shape of a main body portion is different from that of the first embodiment.

A torque sensor 5 according to the fifth embodiment includes a torsion bar 13, a multipole magnet 20, a plurality of first yokes 21, a plurality of second yokes 22, a set of magnetic flux collecting members 50, and two magnetic sensors 31 and 32.

The set of magnetic flux collecting members 50 includes a first magnetic flux collecting member 51 and a second magnetic flux collecting member (not shown) which are all formed of a soft magnetic material. The first magnetic flux collecting member 51 and the second magnetic flux collecting member of the set of magnetic flux collecting members 50 are provided to face each other in the rotation axis direction.

Figure 10:
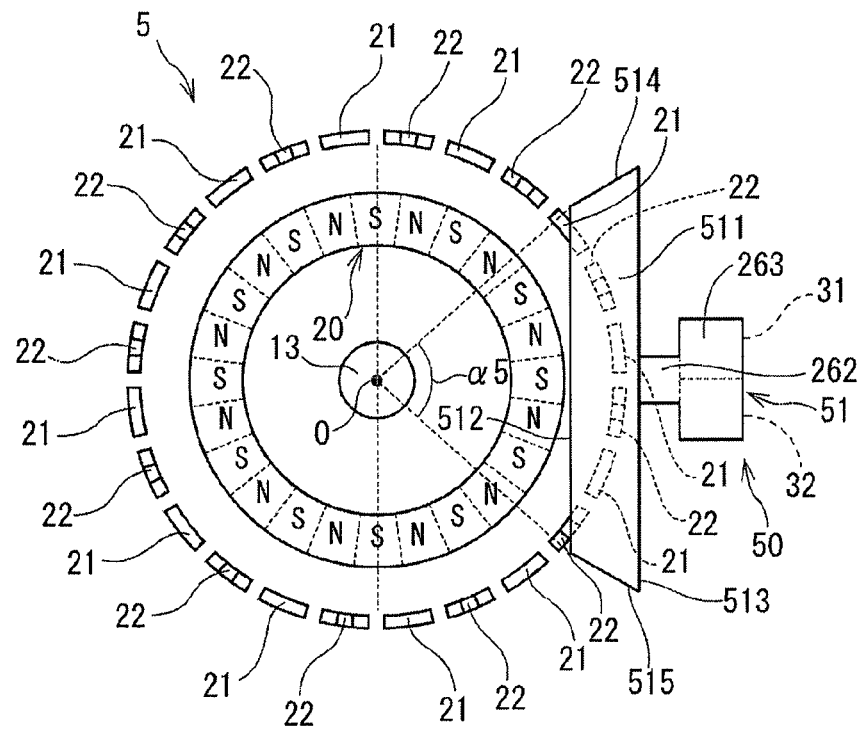
FIG. 10 is a schematic view of a torque sensor according to a fifth embodiment.

FIG. 10 shows schematically an arrangement of the multipole magnet 20, the first yoke 21 and the first magnetic flux collecting member 51 as viewed in the rotation axis direction. The first magnetic flux collecting member 51 includes a first main body portion 511, a first connecting portion 262, and a first supporting portion 263. Here, although the configuration of the first magnetic flux collecting member 51 is described, the second magnetic flux collecting member of the set of magnetic flux collecting members 50 also has the same shape as that of the first magnetic flux collecting member 51.

The first main body portion 511 is positioned on the input shaft 11 side of the plurality of first yokes 21 in the rotation axis direction. The first main body portion 511 is formed such that its cross-sectional shape perpendicular to the rotation axis O is trapezoidal. Specifically, a radially inner side surface 512 of the first main body portion 511 on the multipole magnet 20 side and a radially outer side surface 513 of the first main body portion 511 are formed substantially in parallel. In the cross-sectional shape perpendicular to the rotation axis O, the length of the radially inner side surface 512 is shorter than that of the radially outer side surface 513. A central angle α5 formed by two side surfaces 514 and 515 connecting the side surface 512 and the side surface 513 with a point on the rotation axis O is smaller than 180 degrees. The first main body portion 511 forms the magnetic circuit together with the first yoke 21.

The first connecting portion 262 is provided on the radially outer side surface 513 of the first main body portion 511, and is formed to extend from the first main body portion 511 in the radially outward direction of the multipole magnet 20.

In the torque sensor 5 according to the fifth embodiment, each main body portion of the set of magnetic flux collecting members 50 is formed to have the trapezoidal cross-sectional shape perpendicular to the rotation axis O. The fifth embodiment thus provides the same advantage as that of the first embodiment.

In addition, the set of magnetic flux collecting members 50 including the main body portion is formed in a shape defined by straight lines. Thereby, in comparison to a case where the shape of the magnetic flux collecting member is defined partly by a curved line, the plate material required for manufacturing the plurality of first yokes 21, the plurality of second yokes 22, and the set of magnetic flux collecting members 50 is reduced furthermore thus improving further the yield.

Sixth Embodiment

A torque sensor according to a sixth embodiment will be described with reference to FIG. 11. In the sixth embodiment, the shape of a main body portion is different from that of the first embodiment.

A torque sensor 6 according to the sixth embodiment includes a torsion bar 13, a multipole magnet 20, a plurality of first yokes 21, a plurality of second yokes 22, a set of magnetic flux collecting members 55, and two magnetic sensors 31 and 32.

The set of magnetic flux collecting members 55 includes a first magnetic flux collecting member 56 and a second magnetic flux collecting member (not shown) which are all formed of a soft magnetic material. The first magnetic flux collecting member 56 and the second magnetic flux collecting member of the set of magnetic flux collecting member 55 are provided to face each other in the rotation axis direction.

Figure 11:
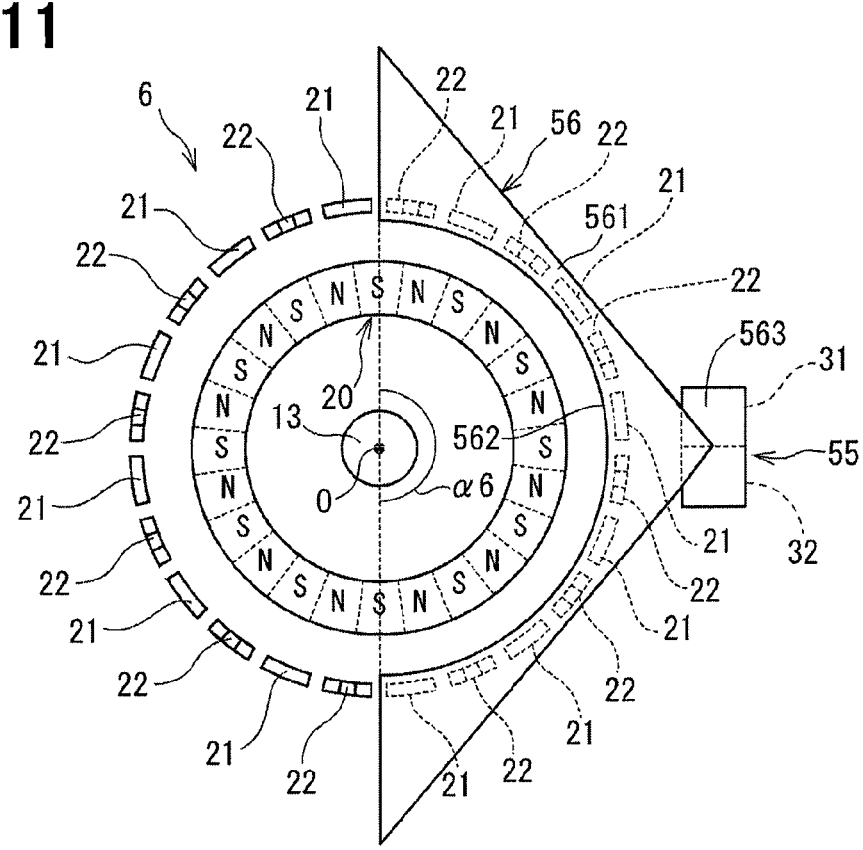
FIG. 11 is a schematic view of a torque sensor according to a sixth embodiment.

FIG. 11 shows schematically an arrangement of the multipole magnet 20, the first yoke 21 and the first magnetic flux collecting member 56 as viewed in the rotation axis direction. The first magnetic flux collecting member 56 includes a first main body portion 561 and a first supporting portion 563. Here, although the configuration of the first magnetic flux collecting member 56 is described, the second magnetic flux collecting member of the set of magnetic flux collecting member 55 also has the same shape as that of the first magnetic flux collecting member.

The first main body portion 561 is positioned on the input shaft 11 side of the plurality of first yokes 21 in the rotation axis direction. The first body portion 561 has a generally triangular shape in cross section perpendicular to the rotation axis O. The generally triangular shape is formed by cutting out a flat plate along the radially outside shape of the multipole magnet 20 to provide a cutout portion 562 on the multipole magnet 20 side, that is, on a side opposite to the first supporting portion 563 of the first main body portion 561. The cutout portion 562 is formed such that its central angle α6 is 180 degrees. The first main body portion 561 forms the magnetic circuit together with the first yoke 21.

The first supporting portion 563 is provided at a pointed end of the first main body portion 561 opposite to the multipole magnet 20. The first supporting portion 563 is formed in a flat plate shape and provided substantially perpendicularly to the rotation axis O to support the magnetic sensors 31 and 32.

In the torque sensor 6 according to the sixth embodiment, the main body portion of the set of magnetic flux collecting members 55 has the triangular shape in cross section perpendicular to the rotation axis O. The triangular shape is formed by cutting out a flat plate along the radially outer shape of the multipole magnet 20 on the side opposite to the connecting portion of the main body portion. The sixth embodiment thus provides the same advantage as that of the first embodiment.

Seventh Embodiment

A torque sensor according to a seventh embodiment will be described with reference to FIG. 12. In the seventh embodiment, the shape of a main body portion is different from that of the first embodiment.

A torque sensor 7 according to the seventh embodiment includes a torsion bar 13, a multipole magnet 20, a plurality of first yokes 21, a plurality of second yokes 22, a set of magnetic flux collecting members 60, and two magnetic sensors 31 and 32.

The set of magnetic flux collecting members 60 includes a first magnetic flux collecting member 61 and a second magnetic flux collecting member (not shown) which are all formed of a soft magnetic material. The first magnetic flux collecting member 61 and the second magnetic flux collecting member of the set of magnetic flux collecting member 60 are provided to face each other in the rotation axis direction.

Figure 12:
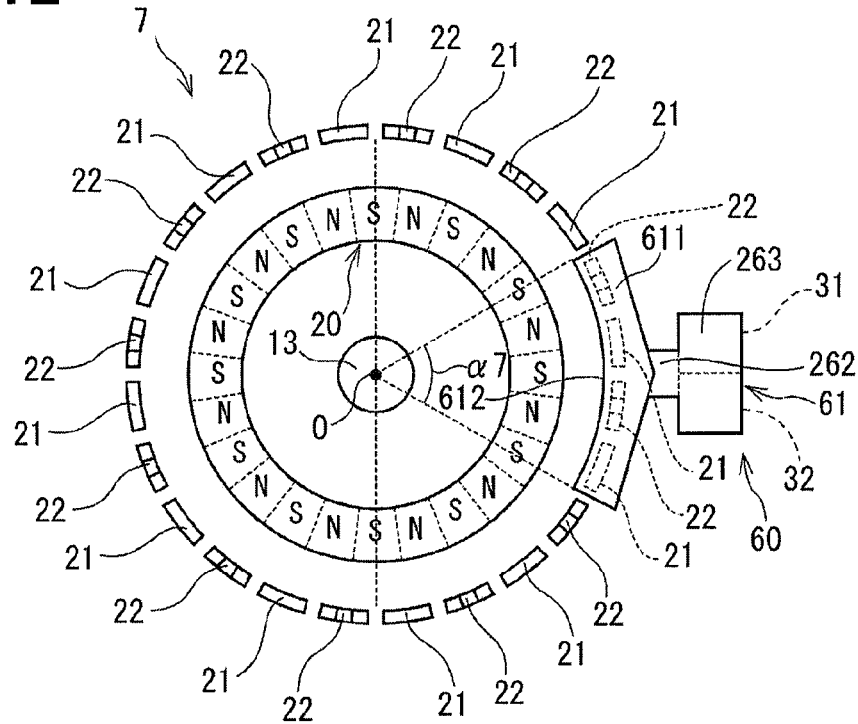
FIG. 12 is a schematic view of a torque sensor according to a seventh embodiment.

FIG. 12 shows schematically an arrangement of the multipole magnet 20, the first yoke 21 and the first magnetic flux collecting member 61 as viewed in the rotation axis direction. The first magnetic flux collecting member 61 includes a first main body portion 611, a first connecting portion 262, and a first supporting portion 263. Here, although the configuration of the first magnetic flux collecting member 61 is described, the second magnetic flux collecting member of the set of magnetic flux collecting members 60 also has the same shape as that of the first magnetic flux collecting member 61.

The first main body portion 611 is positioned on the input shaft 11 side of the plurality of first yokes 21 in the rotation axis direction. The first main body portion 611 has a generally pentagonal shape in cross section perpendicular to the rotation axis O. The pentagonal shape is formed by cutting out a flat plate along the radially outside shape of the multipole magnet 20 on the multipole magnet 20 side, that is, a side opposite to the first connecting portion 262 of the first main body portion 611 thereby providing a cutout portion 612. The cutout portion 612 is formed such that its central angle α7 is smaller than 180 degrees. The first main body portion 611 forms the magnetic circuit together with the first yoke 21.

The first connecting portion 262 is provided on an end face of the first main body portion 611 on the first yoke 21 side, and is formed to extend from the first main body portion 611 in the radially outward direction of the multipole magnet 20.

In the torque sensor 7 according to the seventh embodiment, the main body portion of the set of magnetic flux collecting members 60 has the generally pentagonal shape in cross section perpendicular to the rotation axis O. The pentagonal shape is formed by cutting out the flat plate along the radially outer shape of the multipole magnet 20 on the side opposite to the supporting portion of the main body portion. The seventh embodiment thus provides the same advantage as that of the first embodiment.

Further, the size of the magnetic flux collecting member 60 is smaller than that of the magnetic flux collecting member 55 of the sixth embodiment. As a result, it is possible to further improve the yield while further reducing the area of plate materials required for manufacturing the plurality of first yokes 21, the plurality of second yokes 22, and the set of magnetic flux collecting members 60.

Eighth Embodiment

Figure 13:
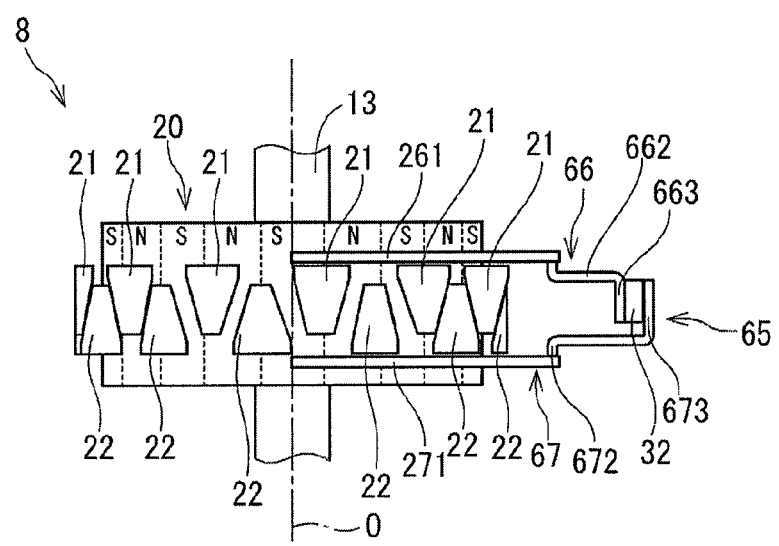
FIG. 13 is a schematic view of a torque sensor according to an eighth embodiment.

A torque sensor according to an eighth embodiment will be described with reference to FIG. 13. In the eighth embodiment, the shapes of a connecting portion and a supporting portion of a magnetic flux collecting member are different from those of the first embodiment.

A torque sensor 8 according to the eighth embodiment includes a torsion bar 13, a multipole magnet 20, a plurality of first yokes 21, a plurality of second yokes 22, a set of magnetic flux collecting members 65, and two magnetic sensors 31 and 32.

The set of magnetic flux collecting members 65 includes a first magnetic flux collecting member 66 and a second magnetic flux collecting member 67 which are all formed of a soft magnetic material. The first magnetic flux collecting member 66 and the second magnetic flux collecting member 67 are provided to face each other in the rotation axis direction as shown in FIG. 13.

The first magnetic flux collecting member 66 includes a first main body portion 261, a first connecting portion 662, and a first supporting portion 663.

The first connecting portion 662 is provided on an end face of the first main body portion 261 on the first yoke 21 side. The first connecting portion 662 is formed to extend from the first main body portion 261 in the radially outward direction of the multipole magnet 20. The first connecting portion 662 guides the magnetic flux of the first main body portion 261 to the first supporting portion 663.

The first supporting portion 663 is provided at an end of the first connecting portion 662 opposite to the side connected to the first main body portion 261. The first supporting portion 663 is formed in a flat plate shape and provided in generally parallel with the rotation axis O to support the magnetic sensors 31 and 32.

The second magnetic flux collecting member 67 includes a second main body portion 271, a second connecting portion 672, and a second supporting portion 673.

The second connecting portion 672 is provided on an end face of the second main body portion 271 on the second yoke 22 side. The second connecting portion 672 is formed to extend from the second main body portion 271 in the radially outward direction of the multipole magnet 20. The second connecting portion 672 has a length in a radially outward direction of the multipolar magnet 20 longer than that of the first connecting portion 662. The second connecting portion 672 guides the magnetic flux of the second main body portion 271 to the second supporting portion 673.

The second supporting portion 673 is provided at an end of the second connecting portion 672 opposite to the side connected to the second main body portion 271. The second supporting portion 673 is formed in a flat plate shape provided in generally parallel with the rotation axis O to support the magnetic sensors 31 and 32 in a manner sandwiching the magnetic sensors 31 and 32 in the radial direction as opposed to the foregoing embodiments, in which the magnetic sensors 31 and 32 are sandwiched in the rotation axis direction.

In the torque sensor 8 according to the eighth embodiment, the magnetic sensors 31 and 32 are supported by the first supporting portion 663 and the second supporting portion 673 which are formed in the plate shape substantially parallel to the rotation axis O. The magnetic sensing surfaces of the magnetic sensors 31 and 32 through which the magnetic flux pass are arranged in the radial direction of the multipole magnet 20. As a result, protrusion of the magnetic sensors 31 and 32 in the radial direction can be made relatively small. Therefore, the eighth embodiment can reduce the physical size of the torque sensor 8 in addition to the advantage of the first embodiment.

Further, in the torque sensor 8, the first supporting portion 663 is provided between the magnetic sensing surfaces of the magnetic sensors 31 and 32 and the multipole magnet 20. Thereby, since the leakage magnetic flux of the multipole magnet 20 is shielded by the first supporting portion 663, it is possible to suppress a decrease in detection sensitivity caused by the leakage magnetic flux of the multipole magnet 20.

Ninth Embodiment

Figure 14:
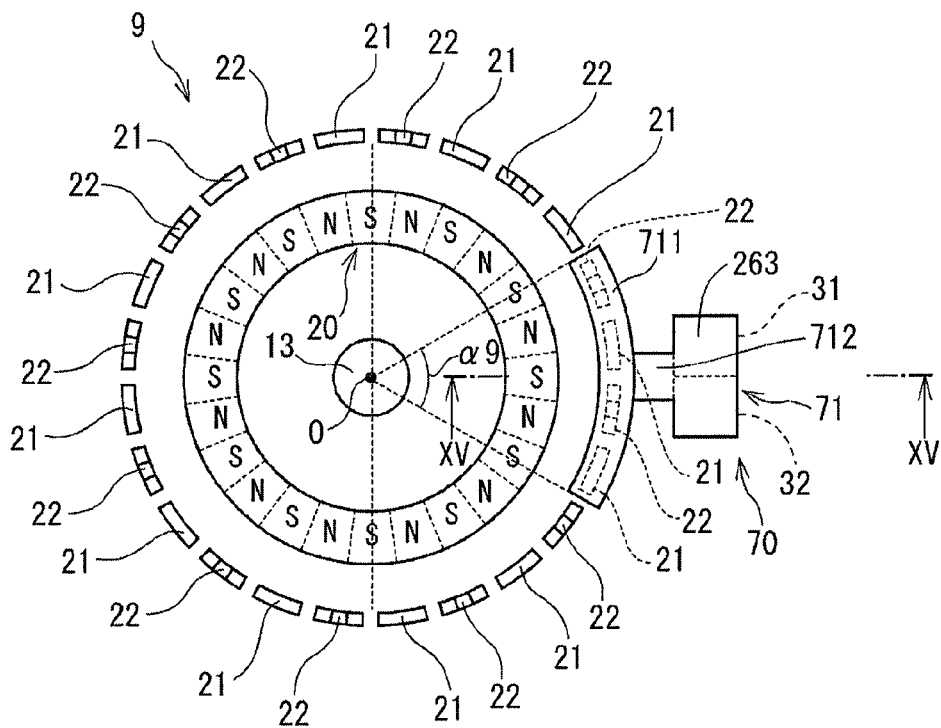
FIG. 14 is a schematic view of a torque sensor according to a ninth embodiment.

A torque sensor according to a ninth embodiment will be described with reference to FIG. 14 and FIG. 15. In the ninth embodiment, the shape of the magnetic flux collecting member is different from that of the first embodiment.

A torque sensor 9 according to the ninth embodiment includes a torsion bar 13, a multipole magnet 20, a plurality of first yokes 21, a plurality of second yokes 22, a set of magnetic flux collecting members 70, and two magnetic sensors 31 and 32.

The set of magnetic flux collecting members 70 includes a first magnetic flux collecting member 71 and a second magnetic flux collecting member 72 which are all formed of a soft magnetic material. The first magnetic flux collecting member 71 and the second magnetic flux collecting member 72 are provided to face each other in the rotation axis direction as shown in FIG. 15.

The first magnetic flux collecting member 71 includes a first main body portion 711, a first connecting portion 712, and a first supporting portion 263.

Figure 15:
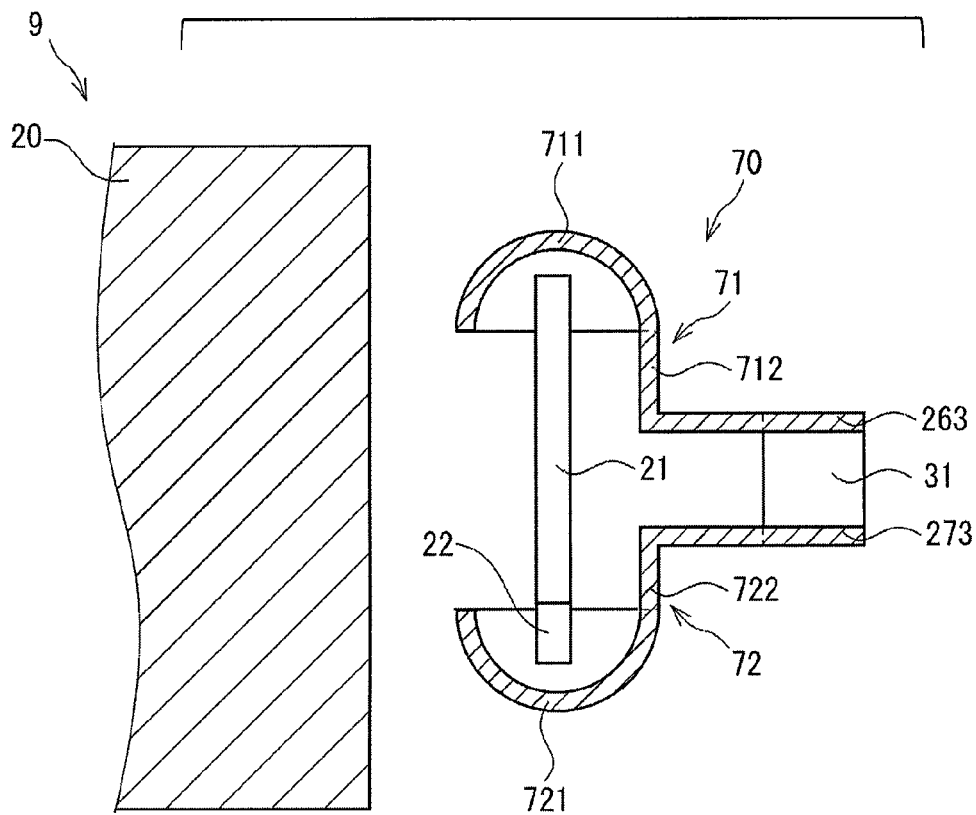
FIG. 15 is a cross-sectional view taken along line XV-XV in FIG. 14.

As shown in FIG. 15, the first main body portion 711 is located between the plurality of first yokes 21 and the multipole magnet 20, on the input shaft 11 side of the plurality of first yokes 21 in the rotation axis direction and at a radially outside of the plurality of first yokes 21 as viewed in the radially outward direction from the multipole magnet 20. That is, the first main body portion 711 is formed to surround the end portion of the first yoke 21, which is on the input shaft 11 side. The first main body portion 711 is formed so that the cross-sectional shape perpendicular to the rotation axis O is a partial annular ring having a central angle α9 smaller than 180 degrees as shown in FIG. 14. The first main body portion 711 forms the magnetic circuit together with the first yoke 21.

The first connecting portion 712 is provided at an end of the first main body portion 711 located radially outside the first yoke 21 as viewed from the multipolar magnet 20. The first connecting portion 712 is formed to extend from the first main body portion 711 in the radially outward direction of the multipole magnet 20. The first connecting portion 712 guides the magnetic flux of the first main body portion 711 to the first supporting portion 263.

The first supporting portion 263 is provided at an end of the first connecting portion 712 opposite to the side connected to the first main body portion 711.

The second magnetic flux collecting member 72 includes a second main body portion 721, a second connecting portion 722, and a second supporting portion 273.

The second main body portion 721 is located, as shown in FIG. 15, between the plurality of second yokes 21 and the multipole magnet 20, on the output shaft 12 side of the plurality of second yokes 22 in the rotation axis direction, and at a radially outside of the plurality of second yokes 21 as viewed from the multipole magnet 20. That is, the second main body portion 721 is formed to surround the end portion of the second yoke 21, which is on the output shaft 12 side. The second main body portion 721 is formed in a partially annular shape having a cross-sectional shape perpendicular to the rotation axis O smaller than 180 degrees, similarly to the first main body portion 261. The second main body portion 721 forms the magnetic circuit together with the second yoke 22.

The second connecting portion 722 is provided at an end of the second main body portion 721 located radially outside the second yoke 21 as viewed from the multipolar magnet 20. The second connecting portion 722 is formed to extend from the second main body portion 721 in the radially outward direction of the multipole magnet 20. The second connecting portion 722 guides the magnetic flux of the second main body portion 721 to the second supporting portion 273.

The second supporting portion 273 is provided at an end of the second connecting portion 722 opposite to the side connected to the second main body portion 721.

In the torque sensor 9 according to the ninth embodiment, the main body portion of the set of magnetic flux collecting members 70 is located between the yoke 21, 22 and the multipole magnet 20 and is located radially outside the yoke as viewed from the multipole magnet 20 in addition to the axial direction of the first yoke 21 or the second yoke 22. As a result, the area of the main body portion 711, 721 facing the yoke becomes relatively large, and hence the magnetic flux density guided to the supporting portion can be increased. Therefore, the ninth embodiment can improve the detection sensitivity of the magnetic sensors 31 and 32 as well as providing the advantage of the first embodiment.

In addition, since the detection sensitivity of the magnetic sensors 31 and 32 can be improved, the main body portion 711, 721 of the magnetic flux collecting member 70 can shorten the circumferential length of the multipole magnet 20 while suppressing a decrease in the detection sensitivity. As a result, it is possible to further reduce the amount of the plate material required to form one set of magnetic flux collecting members 70.

Tenth Embodiment

Figure 16:
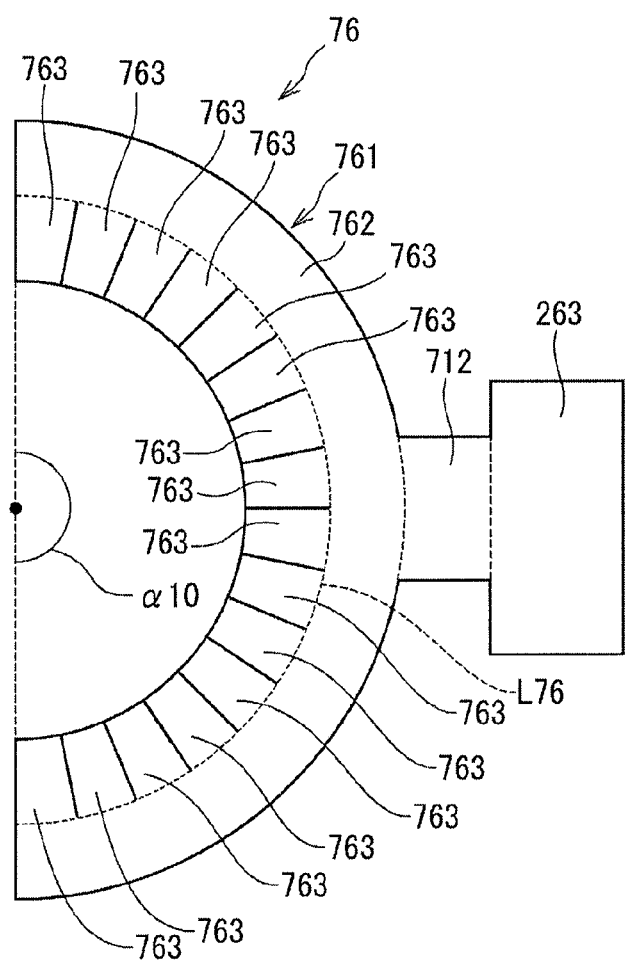
FIG. 16 is a schematic view of a magnetic flux collecting member of a torque sensor according to a tenth embodiment
Figure 17:
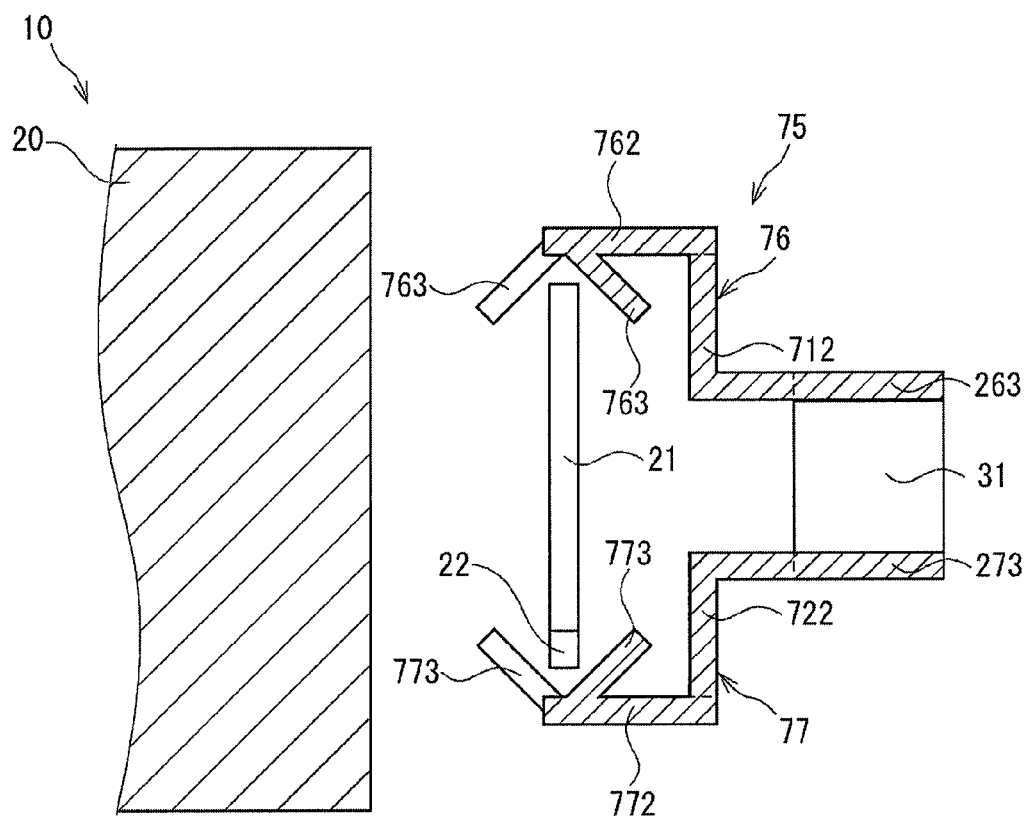
FIG. 17 is a partial cross-sectional view of the torque sensor according to the tenth embodiment.

A torque sensor according to a tenth embodiment will be described with reference to FIG. 16 and FIG. 17. In the tenth embodiment, the shape of a set of magnetic flux collecting members is different from that of the ninth embodiment.

A torque sensor 10 according to the tenth embodiment includes a torsion bar 13, a multipole magnet 20, a plurality of first yokes 21, a plurality of second yokes 22, a set of magnetic flux collecting members 75, and two magnetic sensors 31 and 32.

The set of magnetic flux collecting members 75 include a first magnetic flux collecting member 76 and a second magnetic flux collecting member 77 which are all formed of a soft magnetic material. The first magnetic flux collecting member 76 and the second magnetic flux collecting member 77 are provided to face each other in the rotation axis direction as shown in FIG. 17.

The first magnetic flux collecting member 76 includes a first main body portion 761, a first connecting portion 712, and a first supporting portion 263.

The first main body portion 761 is located between the plurality of first yokes 21 and the multipole magnet 20, on the input shaft 11 side of the plurality of first yokes 21 in the rotation axis direction and at a radially outside the plurality of first yokes 21 viewed from the multipole magnet 20. The first main body portion 761 is formed so that the cross-sectional shape perpendicular to the rotation axis O is a partial annular ring having a central angle α10 of 180 degrees as shown in FIG. 16. The first main body portion 761 forms the magnetic circuit together with the first yoke 21.

The first connecting portion 712 is provided to the first main body portion 761 on the side opposite to the multipole magnet 20. The first connecting portion 712 is formed to extend from the first main body portion 761 in the radially outward direction of the multipole magnet 20.

The first main body portion 761 has an annular portion 762, which is provided as a base connected to the first connecting portion 712, and a plurality of bent portions 763. In case that the first main body portion 761 is punched out of a flat plate by a punch or the like, it is formed to be in a partial annular shape, which has a length in the radial direction longer than that of the annular portion 762 in the radial direction as shown in FIG. 16.

The annular portion 762 is positioned on the input shaft 11 side of the plurality of first yokes 21 in the rotation axis direction.

The plurality of bent portions 763 are provided radially inside of the annular portion 762. The bent portion 763 is formed by cutting an annular portion, which is a radially inner part of the annular portion 762, at a plurality of locations in the radial direction of the annular portion 762. In case that the first magnetic flux collecting member 76 is provided on the input shaft 11 side of the first yoke 21, the bent portions 763 are alternately bent at an arcuate connection line L76 which is a boundary line relative to the annular portion 762. As shown in FIG. 17, the bent portions 763 are bent alternately in the radially inward direction and outward direction to be located between the plurality of first yokes 21 and the multipole magnet 20 or radially outside the plurality of first yokes 21 as viewed from the multipole magnet 20.

The second magnetic flux collecting member 77 includes a second main body portion, which is not shown but is shaped similarly to the first main body portion 761, a second connecting portion 722, and a second supporting portion 273.

The second main body portion is located between the plurality of second yokes 22 and the multipole magnet 20, on the output shaft 12 side of the plurality of second yokes 22 in the rotation axis direction, and at a radially outside of the plurality of second yokes 22 as viewed from the multipole magnet 20. The second main body portion formed so that the cross-sectional shape perpendicular to the rotation axis O is a partial annular portion having a central angle of 180 degrees similarly to the first main body portion 761. The second main body portion forms the magnetic circuit together with the second yoke 22.

The second connecting portion 722 is provided to the second main body portion on the side opposite to the multipole magnet 20. The second connecting portion 722 is formed to extend from the second main body portion in the radially outward direction of the multipole magnet 20.

The second main body portion has an annular portion 772 as a base connected to the second connecting portion 722, and a plurality of bent portions 773. In case that the second main body portion is punched out of a flat plate by a punch or the like, it is formed to be in a partial annular shape, which has a length in the radial direction longer that of the annular portion 772 in the radial direction similarly to the first main body portion 761.

The annular portion 772 is positioned on the output shaft 12 side of the plurality of second yokes 22 in the rotation axis direction.

The plurality of bent portions 773 is formed by cutting the annular portion, which is a radially inner part of the annular portion 772, at a plurality of locations in the radial direction of the annular portion 772. In case that the second magnetic flux collecting member 77 is provided on the output shaft 11 side of the second yoke 22, the bent portions 773 are alternately bent at a connecting portion to the annular ring 772. As shown in FIG. 17, the bent portions 773 which are bent alternately in the radially inward direction and outward direction are formed between the plurality of second yokes 22 and the multipole magnet 20 or radially outside the plurality of second yokes 22 as viewed from the multipole magnet 20.

In the torque sensor 10 according to the tenth embodiment, the main body portion of the set of magnetic flux collecting members 75 is in a flat plate shape having the annular ring, which is connected to the connecting portion, and the plurality of bent portions, when it is punched out from the plate material by a punch. Thereby, the facing area of the main body portion relative to the yoke can be increased relatively by a relatively easy shaping method. Therefore, the tenth embodiment can reduce the manufacturing cost of the torque sensor 10 while providing the advantages of the ninth embodiment.

Other Embodiment

In the embodiments described above, the main body portion of the magnetic flux collecting member is formed to have the central angle α of 180 degrees or less. However, the configuration of the main body portion should not be limited to this configuration. The central angle α may be formed in an annular shape of 360 degrees. Further, the shape of the main body portion is not limited to the partial annular shape, the generally rectangular shape, the generally triangular shape, or the trapezoidal shape.

In the eighth embodiment, the magnetic sensing surface of the magnetic sensor is arranged to be directed in the radial direction of the multipole magnet. However, the direction in which the magnetic sensing surface is directed is not limited to this. It may be in a direction different from the rotation axis.

In the ninth and tenth embodiments, the main body portion of the magnetic flux collecting member is located between the yokes and the multipole magnet, on the rotation axis direction side of the yokes in the rotation axis direction, and radially outside the yoke as viewed from the multipole magnet. However, the position of the main body portion of the magnetic flux collecting member is not limited to this. It may be between the yoke and the multipole magnet and on the rotation axis direction side of the yoke in the rotation axis direction, or on the radially outside of the yoke as viewed from the multipole magnet and the rotation axis direction side of the yoke in the rotation axis direction.

In the above embodiments, the first yoke and the second yoke are the plate members of a generally trapezoidal shape. However, the shapes of the first yoke and the second yoke are not limited to this. It may be a rectangular or triangular shape, or may be a curved shape.

The first yoke is provided radially outside of the end of the multipole magnet on the input shaft side, and the second yoke is provided radially outside of the end of the multipole magnet on the output shaft side. However, the positions where the first yoke and the second yoke are provided are not limited to this. The magnetic circuit may be formed between the first yoke and the first magnetic flux collecting member, and between the second yoke and the second magnetic flux collecting member.

Figure 18:
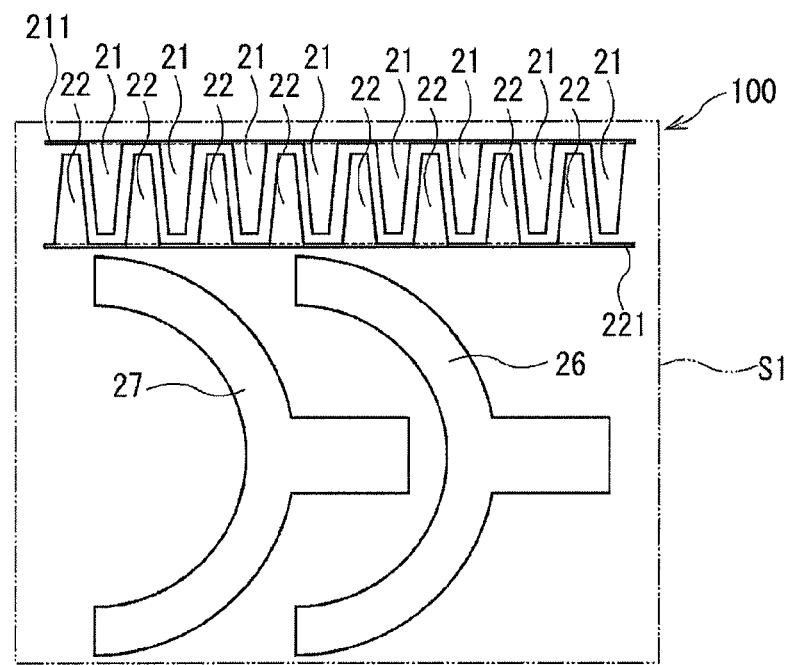
FIG. 18 is a schematic view illustrating a shape of a yoke provided in a torque sensor according to another embodiment.

In the embodiments described above, the plurality of first yokes and the plurality of second yokes are formed by punching out the flat plate individually. However, the method of forming the plurality of first yokes and the plurality of second yokes is not limited to this. For example, as shown in FIG. 18, a member connected by a relatively narrow connecting portion 211 that connects the plurality of first yokes 21 may be punched out of a flat plate. The same applies to the plurality of second yokes 22 connected by a relatively narrow connecting portion 221. Thereby, the plurality of yokes can be handled easily.

Further, the forming method of the plurality of first yokes and the plurality of second yokes is not limited to the method of punching out from the flat plate. For example, a plurality of generally trapezoidal flat plates having a relatively thin thickness may be formed by cutting a bar having a generally trapezoidal cross section.

The present disclosure should not be limited to the embodiments described above, and various other embodiments may be implemented without departing from the scope of the present disclosure.

The present disclosure has been described in accordance with embodiments. However, the present disclosure is not limited to the embodiments and structures described above. The present disclosure also encompasses various modifications and variations within the scope of equivalents. Furthermore, various combination and formation, and other combination and formation including one, more than one or less may be made in the present disclosure.

What is claimed is:

1. A torque sensor comprising:
a torsion bar connecting a first shaft and a second shaft coaxially to convert a torque applied between the first shaft and the second shaft into a torsional displacement;
a multipole magnet fixed to the first shaft or one end side of the torsion bar and alternately magnetized in N pole and S pole in a circumferential direction;
a plurality of first yokes fixed to the second shaft or an other end side of the torsion bar, and provided radially outside the multipole magnet and in equal interval in the circumferential direction;
a plurality of second yokes fixed to the second shaft or the other end side of the torsion bar together with the plurality of first yokes, and provided radially outside the multipole magnet and in equal interval in the circumferential direction in a manner sandwiched between two adjacent first yokes of the plurality of first yokes;

a magnetic flux collecting member including a first main body portion, which is located on a first shaft side of the plurality of first yokes in an axial direction, and a second main body portion, which is located on a second shaft side of the plurality of second yokes in the axial direction, the magnetic flux collecting member forming a magnetic circuit in a magnetic field generated by the multipole magnet together with the plurality of first yokes and the plurality of second yokes; and a magnetic sensor provided radially outside the first main body portion and the second main body portion to detect a magnetic flux density generated in the magnetic circuit, wherein a cross sectional area of the plurality of first yokes are overlapped, in the axial direction, with a cross sectional area of the first main body, a cross sectional area of the plurality of second yokes are overlapped, in the axial direction, with a cross sectional area of the second main body, and the first main body portion and the second main body portion are formed to have radial widths larger than those of the plurality of first yokes and the plurality of second yokes.

2. The torque sensor according to claim 1, wherein:
at least one of the first main body portion and the second main body portion 30 is formed in a partial annular shape in cross section perpendicular to a rotation axis of the first shaft and the second shaft.

3. The torque sensor according to claim 2, wherein:
the at least one of the first main body portion and the second main body portion has a central angle of less than 180 degrees about a center on the rotation axis of the first shaft and the second shaft.

4. The torque sensor according to claim 1, wherein:
at least one of the first main body portion and the second main body portion is formed in a rectangular shape in cross section perpendicular to a rotation axis of the first shaft and the second shaft, the rectangular shape being cut out partly along a radially outer shape of the multipole magnet.

5. The torque sensor according to claim 1, wherein:
at least one of the first main body portion and the second main body portion is formed in a triangular shape in cross section perpendicular to a rotation axis of the first shaft and the second shaft, the triangular shape being cut out partly along a radially outer shape of the multipole magnet.

6. The torque sensor according to claim 1, wherein:
the magnetic flux collecting member includes a first supporting member, which is provided radially outside the first main body portion to support the magnetic sensor, and a second supporting member, which is provided radially outside the second main body portion and radially outside the first supporting member; and the magnetic sensor is provided between the first supporting member and the second supporting member, and formed to have a magnetic flux sensing surface, through which the magnetic flux in the magnetic circuit passes and which is directed in a radial direction of the multipole magnet.

7. The torque sensor according to claim 1, further comprising:
a connecting member connecting at least either one of the plurality of first yokes and the plurality of second yokes.

8. The torque sensor according to claim 1, wherein:
the at least one of the first main body portion and the second main body portion has a base portion, which is located on a first shaft side of the plurality of first yokes in the axial direction or on a second shaft side of the plurality of second yokes in the axial direction, and a bent portion, which is formed in the base portion and bendable relative to the base portion.

* * * * *